(12) United States Patent
Shin

(10) Patent No.: US 8,075,167 B2
(45) Date of Patent: *Dec. 13, 2011

(54) OPTICAL FILM AND ILLUMINATING DEVICE HAVING THE SAME

(75) Inventor: Yong Shu Shin, Chungju-si (KR)

(73) Assignee: LG Electronics Inc., Seoul (KR)

( * ) Notice: Subject to any disclaimer, the term of this patent is extended or adjusted under 35 U.S.C. 154(b) by 444 days.

This patent is subject to a terminal disclaimer.

(21) Appl. No.: 12/267,844

(22) Filed: Nov. 10, 2008

(65) Prior Publication Data

US 2009/0290373 A1    Nov. 26, 2009

(30) Foreign Application Priority Data

May 20, 2008  (KR) .................. 10-2008-0046714
Aug. 20, 2008  (KR) .................. 10-2008-0081479

(51) Int. Cl.
*F21V 33/00*    (2006.01)

(52) U.S. Cl. ......... 362/340; 362/339; 362/551; 362/582

(58) Field of Classification Search .................. 362/339, 362/340, 551, 558; 428/172; 359/599
See application file for complete search history.

(56) References Cited

U.S. PATENT DOCUMENTS

| | | | |
|---|---|---|---|
| 4,750,798 A | 6/1988 | Whitehead | |
| 4,996,632 A | 2/1991 | Aikens | 362/32 |
| 5,134,549 A * | 7/1992 | Yokoyama | 362/623 |
| 5,258,896 A | 11/1993 | Dreyer, Jr. | 362/307 |
| 5,700,077 A | 12/1997 | Dreyet et al. | |
| 5,745,632 A * | 4/1998 | Dreyer | 385/133 |
| 6,123,442 A | 9/2000 | Freier et al. | |
| 6,520,655 B2 * | 2/2003 | Ohuchi | 362/612 |
| 6,612,729 B1 * | 9/2003 | Hoffman | 362/551 |
| 6,706,339 B1 | 3/2004 | Miyatake et al. | |
| 6,796,686 B2 * | 9/2004 | Jacob et al. | 362/293 |
| 7,553,045 B2 | 6/2009 | Hung | 362/249.01 |
| 7,658,514 B2 * | 2/2010 | Lee et al. | 362/307 |
| 7,748,874 B2 | 7/2010 | Cho | |
| 2002/0141065 A1 | 10/2002 | Cowan et al. | |
| 2004/0066654 A1 * | 4/2004 | Jacob et al. | 362/293 |
| 2004/0218390 A1 | 11/2004 | Holman et al. | 362/245 |
| 2007/0018185 A1 | 1/2007 | Hung | 257/98 |

FOREIGN PATENT DOCUMENTS

| | | |
|---|---|---|
| CN | 1451099 | 10/2003 |
| CN | 1504773 | 6/2004 |
| CN | 2879153 | 3/2007 |
| CN | 1971316 | 5/2007 |
| CN | 201003697 | 1/2008 |
| CN | 101122650 | 2/2008 |

(Continued)

OTHER PUBLICATIONS

Office Action dated Oct. 5, 2010 for U.S. Appl. No. 12/267,856.

(Continued)

*Primary Examiner* — John A Ward
(74) *Attorney, Agent, or Firm* — KED & Associates, LLP (57) ABSTRACT

An optical film and an illuminating device having the optical film are provided. The optical film may include a first surface including a plurality of peaks and valleys formed from the plurality of peaks, a second surface opposite the first surface and a plurality of scattering patterns on the second surface. One of the scattering patterns may correspond to 3 to 6 peaks of the plurality of peaks on the first surface.

16 Claims, 10 Drawing Sheets

FOREIGN PATENT DOCUMENTS

| | | |
|---|---|---|
| DE | 298 05 667 U1 | 7/1998 |
| EP | 0 225 123 A2 | 6/1987 |
| EP | 1 591 826 A1 | 11/2005 |
| GB | 2 145 760 A | 4/1985 |
| JP | 2001-074919 | 3/2001 |
| KR | 10-2002-0091255 | 12/2002 |
| KR | 10-2008-0014387 | 2/2008 |
| WO | WO 95/30218 A1 | 11/1995 |
| WO | WO 01/71396 | 9/2001 |
| WO | WO 2007/046337 A1 | 4/2007 |
| WO | WO 2007/064615 A1 | 6/2007 |

OTHER PUBLICATIONS

U.S. Office Action for U.S. Appl. No. 12/268,160 dated Dec. 1, 2009.
European Office Action dated Feb. 23, 2010for related application 08019377.4.
European Office Action dated Feb. 23, 2010for related application 08019376.6.
Korean Office Action dated Feb. 25, 2010 for related applicationMay 9, 2010—008452107.
Korean Office Action dated Feb. 25, 2010 for related applicationMay 9, 2010—008360756.
European Search Report dated Aug. 5, 2009 for Application No. 08019376.6.
European Search Report dated Aug. 5, 2009 for Application No. 08019377.4.
European Search Report dated Aug. 5, 2009 for Application No. 08019379.0.
English translation of Chinese Office Action dated Apr. 29, 2010.
English translation of Chinese Office Action dated Nov. 25, 2010 for Application No. 200810182910.0.
English translation of Chinese Office Action dated Dec. 14, 2010 for Application No. 200810182909.8.
English translation of Chinese Office Action dated Jun. 4, 2010for Chinese Application No. 200810182910.0.
Office Action dated Mar. 21, 2011 from U.S. Appl. No. 12/267,856.
Office Action dated Jun. 28, 2011 for co-pending U.S. Appl. No. 12/267,874.
Chinese Office Action for Application 200810182910.0 dated Jul. 13, 2011.

\* cited by examiner

OPTICAL FILM AND ILLUMINATING DEVICE HAVING THE SAME

This application claims priority from Korean Patent Applications No. 10-2008-0046714, filed May 20, 2008 and No. 10-2008-0081479, filed Aug. 20, 2008, the subject matter of which is incorporated herein by reference.

BACKGROUND

1. Field

Embodiments of the present invention may relate to an optical film and an illuminating device having the optical film. More particularly, embodiments at the present invention may relate to an optical film having a patterned first surface and a second surface having a plurality of scattering (or dot) patterns formed thereon.

2. Background

Illuminating devices that include a light pipe capable of transmitting light to a remote place with less transmission loss may be used in various places (for example, inside and outside a building). Light pipes may also be referred to as light conduits, light guides or light tubes, and have been used to effectively distribute light across a wide area for various purposes such as for illumination.

Light pipes may be used not only for illuminating certain points but also for illuminating whole areas. Light that transmits through a light pipe may be distributed to outside of the light pipe for illuminating certain points or for maximizing the effect of illumination.

However, illuminating devices using a light pipe may provide different illuminance levels according to their distances from a light source, and thus may not be able to achieve uniform brightness across a longitudinal direction of a light pipe.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
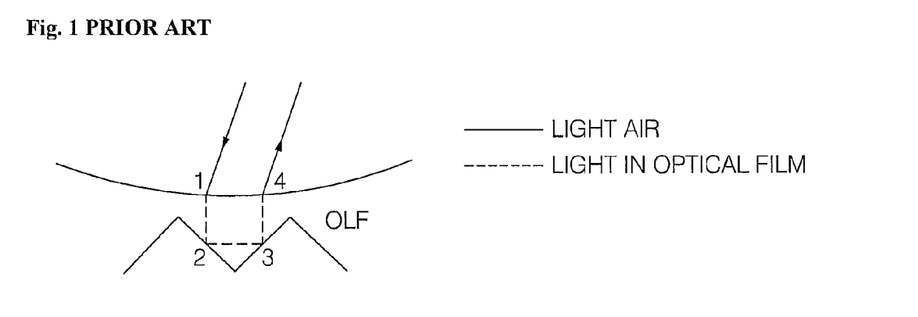
FIG. 1 illustrates a cross-sectional view of an optical film.
Figure 2:
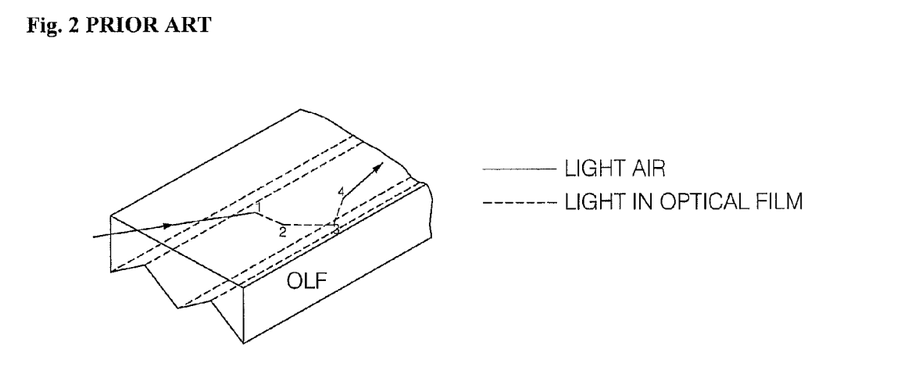
FIG. 2 illustrates a perspective view of the optical film shown in FIG. 1.

FIG. 1 illustrates a cross-sectional view of an optical film that transmits and reflects light in a light pipe. FIG. 2 illustrates a perspective view of the optical film shown in FIG. 1. Other embodiments and configurations are also within the scope of the present invention. For ease of discussion, a patterned surface of an optical film is a top surface, and a non-patterned surface of the optical film is a bottom surface.

As shown in FIGS. 1 and 2, light generated by a light source (not shown) of a light pipe may be incident upon a non-patterned surface of an optical film (OLF) and may then be refracted at position 1 on the optical film. The refracted light may be totally reflected at positions 2 and 3 on both lateral sides of a prism of the optical film. Thereafter, the totally-reflected light may be refracted at position 4 on the optical film and may be thus incident back into the light pipe.

Light may travel along a longitudinal direction of the light pipe. Since light loss rarely occurs in air inside the light pipe, the light pipe may effectively transmit light even to a remote area without any light loss (or with minimal light loss)

Figure 3:
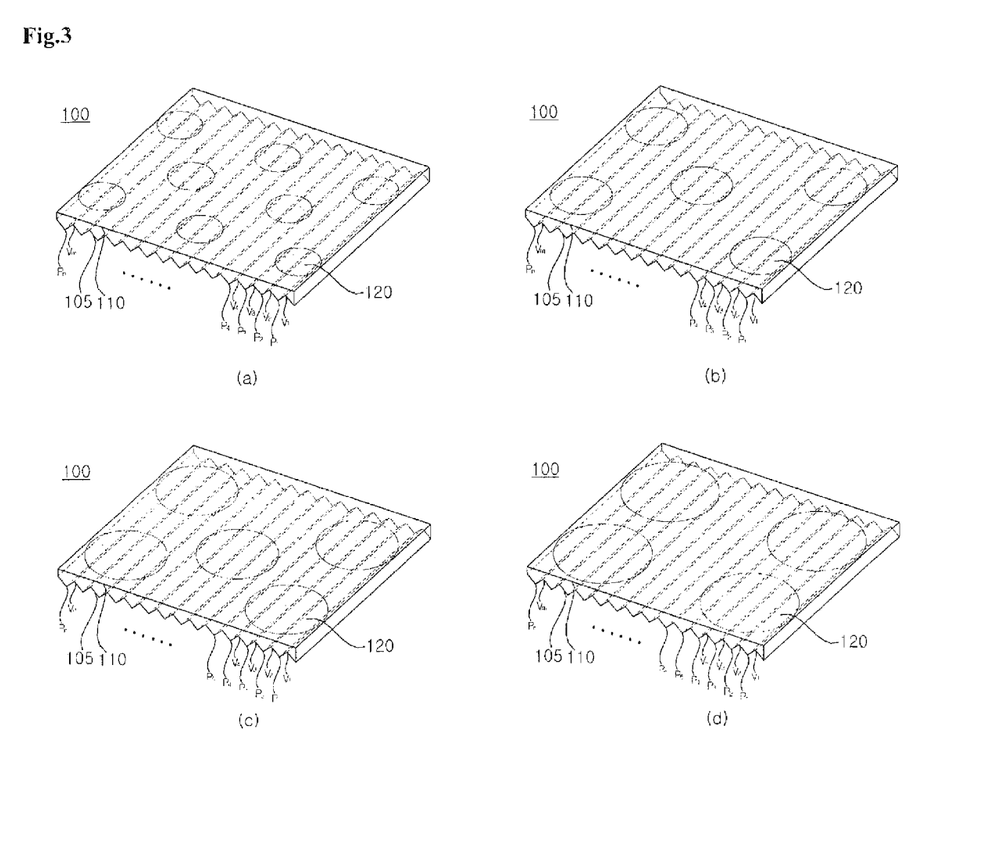
FIGS. 3(a)-3(d) illustrate perspective views of optical films according to example embodiments of the present invention.

FIGS. 3(a)-3(d) illustrate perspective views of optical film according to example embodiments of the present invention. Other embodiments and configurations are also within the scope of the present invention. As shown in FIG. 3, each of the optical films 100 may include a first surface 105, a second surface 110 and a plurality of scattering patterns 120 (or dot patterns) on the second surface 110. Each of the scattering patterns may be a dot pattern. The first surface 105 may have a plurality of peaks P1 through Pn and a plurality of valleys V1 through Vm formed from the peaks. The second surface 110 may be opposite the first surface 105 and may be substantially smooth or flat. One of the scattering patterns 120 may correspond to three to six peaks of the plurality of peaks of the first surface 105. Stated differently, one of the scattering patterns on the second surface 110 has an area that corresponds to three to six peaks. The three peaks may be P1, P2 and P3 as shown in FIG. 3(a). The six peaks may be P1, P2, P3, P4, P5 and P6.

The first surface 105 shown in FIG. 3 may include a linear array of prisms. That is, the plurality of peaks and the plurality of valleys may be formed from the linear array of prisms. Embodiments of the present invention are not limited to this arrangement. That is, a lenticular lens array or a micro-lens array (MLA) may also be provided on the first surface 105. For ease of illustration, the first surface 105 includes a linear array of prisms.

Each of the optical films 100 may be formed of a thermoplastic resin material with high optical transmittance and well-balanced mechanical and electrical properties. For example, the optical film 100 may be formed of at least one of polycarbonate (PC), syndiotactic polymethyl metacrylate (PMMA), atatic PMMA, polyether ether ketone (PEEK) and polyethylene terephtalate (PET).

The scattering patterns 120 may be formed on the second surface 110 opposite the first surface 105 having the peaks P1-Pn and the valleys V1-Vm in order to effectively scatter light. The scattering patterns 120 may be printed on the second surface 105 using white ink, for example.

In order to effectively scatter light and thus to reduce a difference between illuminance at a region near a light source unit and illuminance at a region distant from the light source unit, at least one of the scattering patterns 120 may correspond to three to six peaks of the first surface 105. More than one of the scattering patterns 120 may also correspond to three to six peaks.

As shown in FIG. 3(c), one of the scattering patterns 120 may correspond to three peaks, namely peaks P1, P2 and P3. As shown in FIG. 3(b), one of the scattering patterns 120 may correspond to four peaks, namely peaks P1, P2, P3 and P4. Additionally, as shown in FIG. 3(c), one of the scattering patterns 120 may correspond to five peaks, namely peaks P1, P2, P3, P4 and P5. And as shown in FIG. 3(d), one of the scattering patterns 120 may correspond to six peaks, namely peaks P1, P2, P3, P4, P5 and P6.

Alternatively, at least one of the scattering patterns 120 on the first surface 105 may correspond to three to six valleys.

A number of peaks that correspond to each of the scattering patterns 120 will be described below in further detail with reference to FIG. 5.

Figure 4:
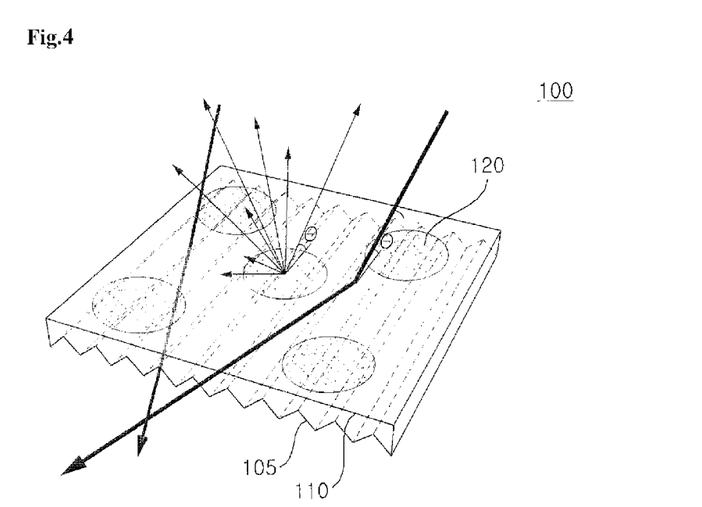
FIG. 4 shows reflection and refraction of light by an optical film.

FIG. 4 shows reflection and refraction of light by an optical film. As shown in FIG. 4, the optical film 100 includes the first surface 105 having a plurality of peaks and a plurality of valleys formed from the plurality of peaks, the second surface 110 opposite the first surface 105 and which is generally flat, and the plurality of scattering patterns 120 formed on the second surface 110. The first surface 105, the second surface 110 and the scattering patterns 120 have been previously described with reference to FIGS. 3(a)-3(d), and therefore a further detailed description will not be provided.

According to Snell's Law, light incident upon the optical film 100 may be reflected by the optical film 100, rather than reaching the first surface 105, when an angle of incidence is greater than a critical angle θ of the optical film 100, which is determined by a ratio of refractive indexes of the optical film 100 and a medium surrounding the optical film 100. Since the medium surrounding the optical film 100 is air, the incident light may be reflected by the second surface 110 almost without any light loss.

On the other hand, when the angle of incidence is less than the critical angle θ, then the incident light may be readily emitted from the optical film 100.

Light incident upon the scattering patterns 120 may be effectively scattered and reflected.

Figure 5:
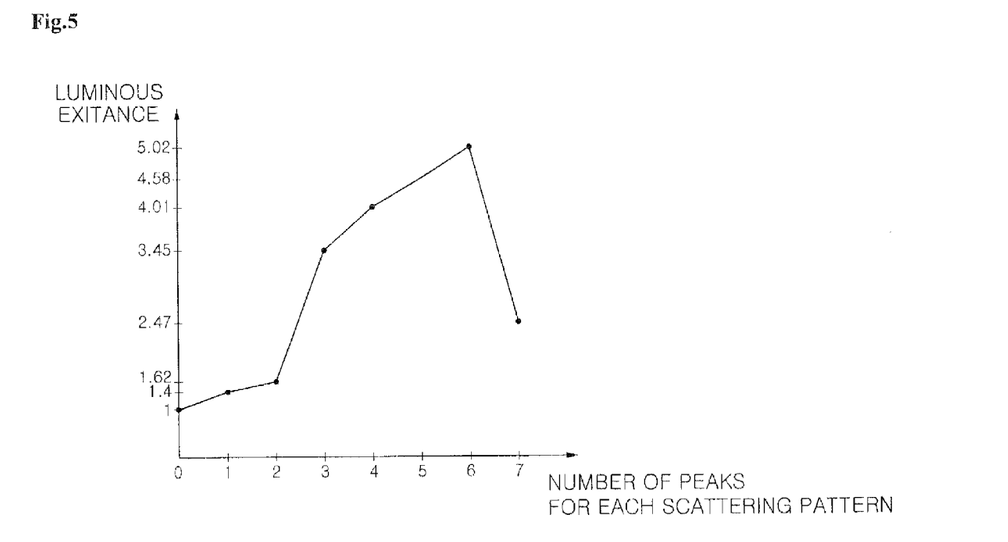
FIG. 5 illustrates a graph showing a relationship between a number of prism peaks corresponding to each scattering pattern of an optical film and a luminous exitance of the optical film.

FIG. 5 illustrates a graph showing a relationship between a number of peaks corresponding to each scattering pattern of an optical film and a luminous exitance of the optical film. Other embodiments and configurations are also within the scope of the present invention.

Table 1 also shows a relationship between a number of peaks corresponding to each scattering pattern of an optical film and a luminous exitance of the optical film. In the following Table 1, X and O represent bad and good states.

TABLE 1

| Number of Peaks Corresponding to Each Scattering Pattern | Luminous Exitance | Illuminance Uniformity |
| --- | --- | --- |
| 0 | 1.00 | x |
| 1 | 1.40 | x |
| 2 | 1.62 | x |
| 3 | 3.45 | o |
| 4 | 4.01 | o |
| 5 | 4.58 | o |

TABLE 1-continued

| Number of Peaks Corresponding to Each Scattering Pattern | Luminous Exitance | Illuminance Uniformity |
| --- | --- | --- |
| 6 | 5.02 | o |
| 7 | 2.47 | x |

Luminous exitance is a ratio of luminous flux at a distance of 1 meter (m) from a light source when no scattering patterns are used and luminous flux at a distance of 1 m from the light source when scattering patterns are used. Luminous flux is an amount of light passing through a unit area perpendicular to the direction of incidence and is measured in lumen.

Referring to FIG. 5 and Table 1, when the number of peaks corresponding to each scattering pattern of an optical film is 3 or more, scattering performance of the optical film may be improved. Accordingly, the luminous exitance of an optical film may be increased and thus may be easier to uniformly emit light from a whole optical film.

When the number of peaks corresponding to each scattering pattern of an optical film is 6 or less, excessive scattering may be prevented. Accordingly, the luminous exitance of an optical film may be prevented from decreasing and it therefore may be easier to uniformly emit light from a whole optical film.

Therefore, the number of peaks corresponding to each scattering pattern of an optical film may be 3 to 6. In this case, luminous exitance may be increased and thus light may be transmitted from one end to another end of an optical film. In addition, optical transmittance of an optical film may be improved and thus uniformity of luminance of an optical film may also be improved.

Figure 6:
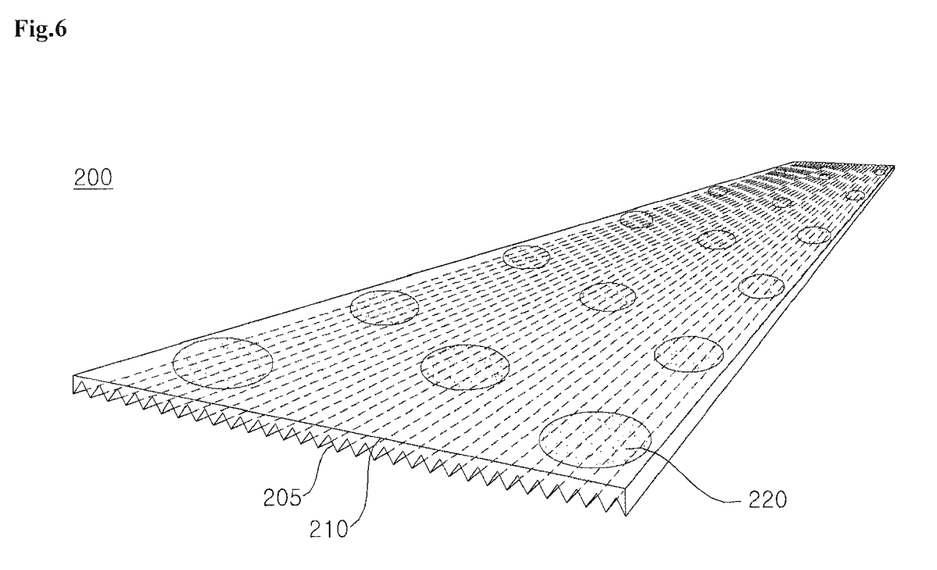
FIG. 6 illustrates a perspective view of an optical film according to another example embodiment of the present invention.

FIG. 6 illustrates a perspective view of an optical film according to another example embodiment of the present invention. Other embodiments and configurations are also within the scope of the present invention.

Referring to FIG. 6, an optical film 200 may include a first surface 205, a second surface 210 opposite the first surface 205 and a plurality of scattering patterns 220. The first surface 205 may have a plurality of peaks and a plurality of valleys formed from the plurality of valleys. The second surface may be substantially smooth or flat. The first surface 205, the second surface 210 and the scattering patterns 220 may be the same as their respective counterparts of FIGS. 3(a)-3(d). The exemplary embodiment of FIG. 6 will hereafter be described by focusing on differences from the embodiments of FIGS. 3(a)-3(d).

The area of each of the scattering patterns 220 may gradually increase from one end to the other end of the optical film 200.

When a light source unit is provided on one side (or end) of the optical film 200, luminous intensity may gradually decrease according to distance from the light source unit. Therefore, in order to effectively scatter light, the area of each of the scattering patterns 220 may gradually increase from one end to the other end of the optical film 200.

More specifically, the area of one scattering pattern 220 near a light source unit (not shown) may be greater than an area of another scattering pattern 220 distant from the light source unit. For example, the scattering pattern 220 closest to a light source unit (not shown) may correspond to three peaks on the first surface 205, and a scattering pattern 220 most distant from the light source unit may correspond to six peaks on the first surface 205. Additionally, a total area of the scattering patterns 220 at an area of the optical film 200 near the light source may be greater than a total area of the scattering patterns at another area of the optical film 220 away from the light source.

A number of peaks corresponding to each scattering pattern 220 may gradually increase from three to six according to a distance of the scattering pattern from a light source unit. Thus, the scattering pattern 220 closest to the light source unit may correspond to three peaks on the first surface 205, and the scattering pattern 220 most distant from the light source unit may correspond to six peaks on the first surface 205. Accordingly, light may be effectively scattered and improve luminous efficiency of an optical film may be improved in distant portions of the optical film receiving only a small amount of light from a light source.

A density of the scattering patterns 220 may increase from one end of the optical film 200 to the other end of the optical film 200. In this case, the scattering patterns 220 may have a same size.

Light incident upon the optical film 200 may be effectively scattered and luminous efficiency of the optical film 200 may be improved by gradually increasing the density of the scattering patterns 220 from one end of the optical film 200 to the other end of the optical film 200.

Figure 7:
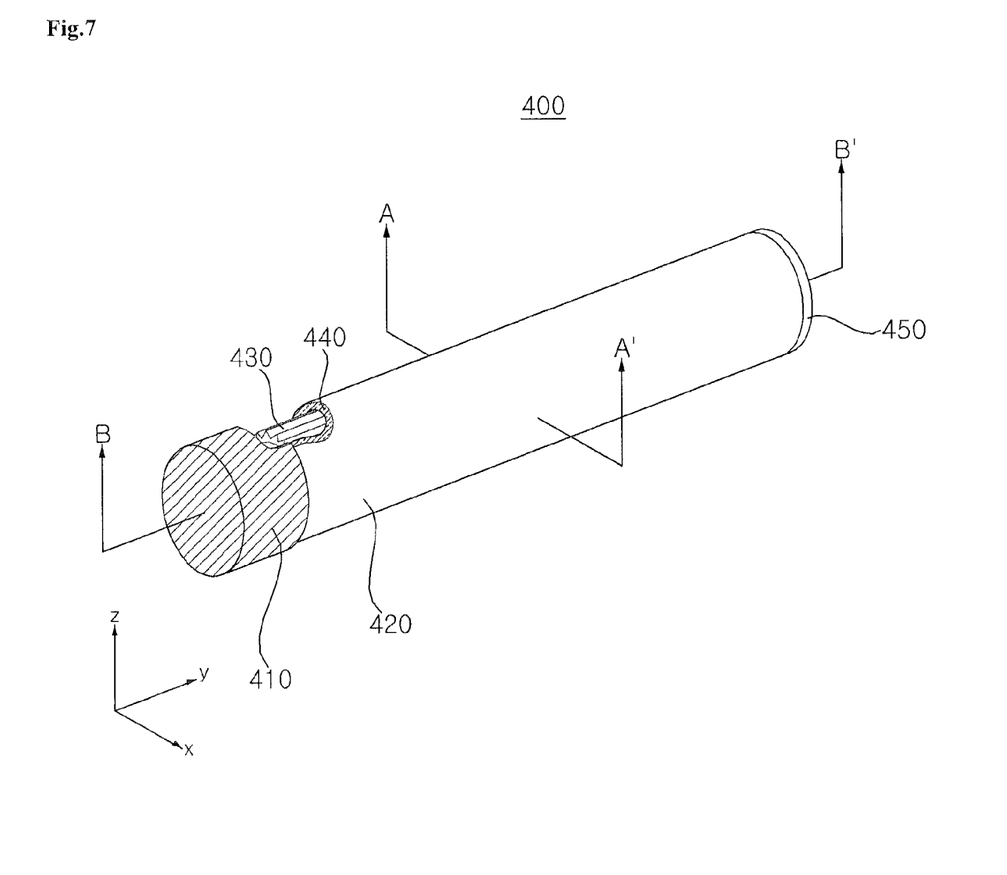
FIG. 7 illustrates an exploded perspective view of an illuminating device according to an example embodiment of the present invention.

FIG. 7 illustrates a perspective view of an illuminating device according to an example embodiment of the present invention. Other embodiments and configurations are also within the scope of the present invention. As shown in FIG. 7, an illuminating device 400 may include a light source unit 410, a light pipe 420 and a reflecting cap 450.

The light source unit 410 may generate light and provide the generated light to the light pipe 420. The light source unit 410 may include at least one lamp (not shown). The light generated by the light source unit 410 may be provided to the light pipe 420, and may thus be emitted from the light pipe 420.

The light pipe 420 may emit light by transmitting and distributing the light generated by the light source unit 410.

The light pipe 420 may include an optical film 430 that reflects or refracts the light generated by the light source unit 410, and a supporter 440 that surrounds the optical film 430. The optical film 430 may correspond to the optical film discussed above.

The optical film 430 may include a first surface, a second surface and a plurality of scattering patterns formed on the second surface. The first surface may have a plurality of peaks and a plurality of valleys formed from the plurality of valleys. The second surface may be opposite the first surface and may be substantially smooth or flat. At least one of the scattering patterns may correspond to three to six peaks of the first surface.

The first surface of the optical film 430 is shown in FIG. 7 as having a linear array of prisms. That is, the plurality of peaks and the plurality of valleys may be formed from the linear array of prisms. Embodiments of the present invention are not limited to this arrangement. For ease of illustration, the first surface of the optical film 430 includes the linear array of prisms.

The optical film 430 may be provided in a rolled shape to have a hollow conduit extending along a longitudinal array of the prisms (i.e., a y direction). The optical film 430 may transmit light to a distant region from the light source unit 410 by reflecting or refracting the light generated by the light source 410. The rolled shape may be a fully rolled shape or a partially rolled shape.

The reflecting cap 450 may be attached to an end of the light pipe 420. The reflecting cap 450 may reflect light transmitted and distributed by the light pipe 420.

One end of the light pipe 420 may be coupled to the light source unit 410, and the reflecting cap 450 may be attached to the other end of the light pipe 420. The reflecting cap 450 may include a reflective mirror (not shown) that reflects light transmitted along the light pipe 420.

Due to the reflecting cap 450, light may be confined within the light pipe 420 and may thus improve brightness of the illuminating device 400.

Figure 8:
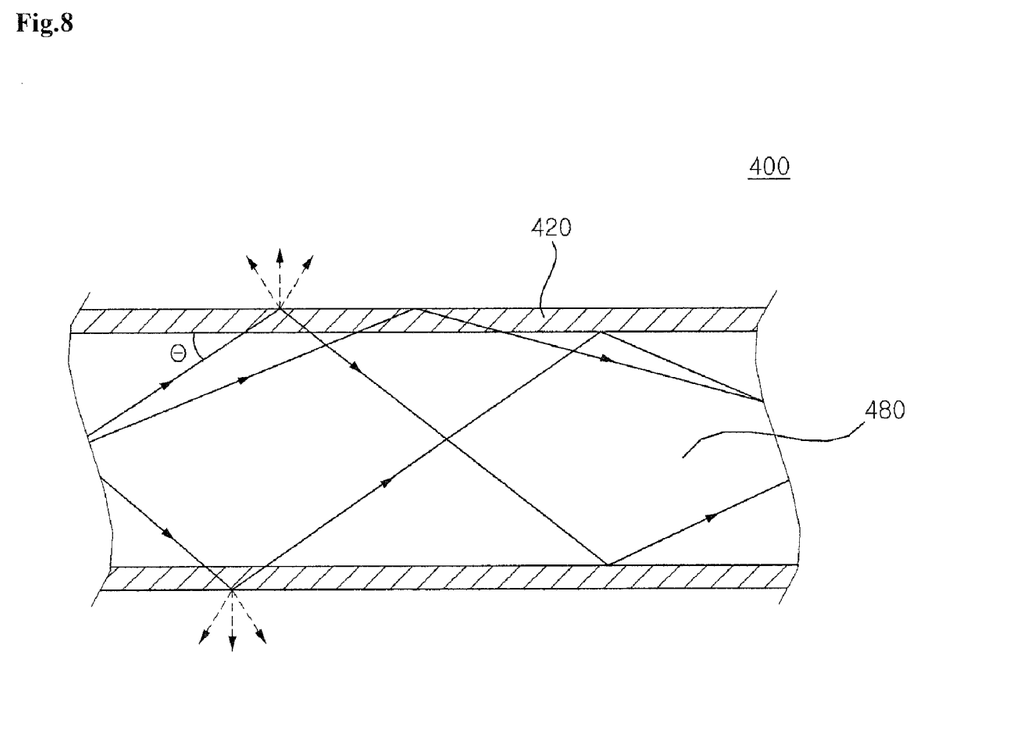
FIG. 8 illustrates a longitudinal cross-sectional view of part of the illuminating device shown in FIG. 7.

FIG. 8 illustrates a longitudinal cross-sectional view of part of the illuminating device 400 shown in FIG. 7. Other embodiments and configurations are also within the scope of the present invention. A light source (not shown) may be supplied with power by an external power source and thus provides light to the light pipe 420 shown in FIG. 8.

According to Snell's law, light incident into the light pipe 420 may be reflected and may thus be confined in the light pipe 420 when an angle of incidence is greater than a critical angle θ of an optical film (not shown), which may be determined by a ratio of refractive indexes of the optical film and a medium surrounding the optical film. As a result, the incident light may travel along a longitudinal direction of the light pipe 420.

Since a hollow conduit (or area) 480 of the light pipe 420 is filled with air, the medium surrounding the light pipe 420 is air. Therefore, the incident light may be guided within the light pipe 420 without any light loss (or with minimal light loss).

On the other hand, when the angle of incidence is less than the critical angle θ, then the incident light may be readily emitted from the optical film.

Some of light incident into the light pipe 420 may travel along the longitudinal direction of the light pipe 420, and some of the incident light may be emitted from the light pipe 420.

Figure 9:
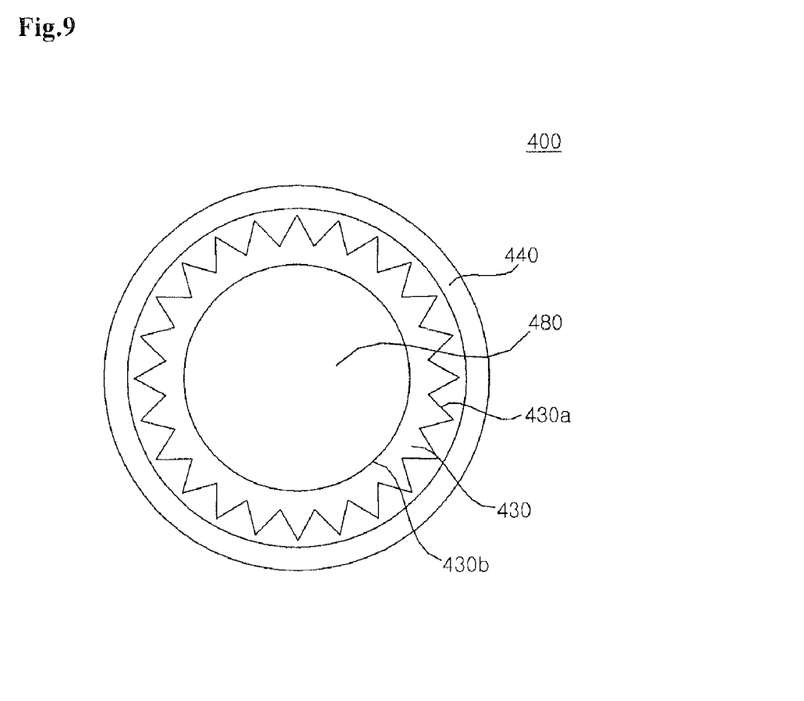
FIG. 9 illustrates a cross-sectional view of the illuminating device taken along line A-A' of FIG. 7.

FIG. 9 illustrates a cross-sectional view of the illuminating device 400 taken along line A-A' of FIG. 7. Other embodiments and configurations are also within the scope of the present invention.

As shown in FIG. 9, the illuminating device 400 may include the optical film 430 having a patterned first surface 430a, a second surface 430b and a supporter 440 surrounding the optical film 430.

A linear array of prisms may be formed on the first surface 430a and thus form the plurality of peaks and the plurality of valleys. The linear array of prisms may extend along the longitudinal direction of the illuminating device 400 (i.e., the y direction shown in FIG. 7). The cross-section of each of the prisms in the linear prism array may have the shape of an isosceles triangle, a regular triangle or a trapezoid, for example. The first surface 430a of the optical film 430 may face the supporter 440.

The supporter 440 may be provided outside of the optical film 430 so as to surround the optical film 430. The supporter 440 may protect the optical film 430 from dust and/or external shock.

The optical film 430 may be formed of a thermoplastic resin material with high optical transmittance and excellent shock-resistant and heat-resistant properties. For example, the optical film 430 may be formed of at least one of PC, syndiotactic PMMA, atatic PMMA, PEEK and PET. In particular, PC may be suitable for use in fabrication of the optical film 430 because PC is highly rigid, is rarely broken and deformed, and has high visible light transmittance.

The supporter 440 may be formed of a copolymer of at least one selected from PC, PMMA, acryl, polypropylene, polystyrene and polyvinyl chloride (PVC).

Figure 10:
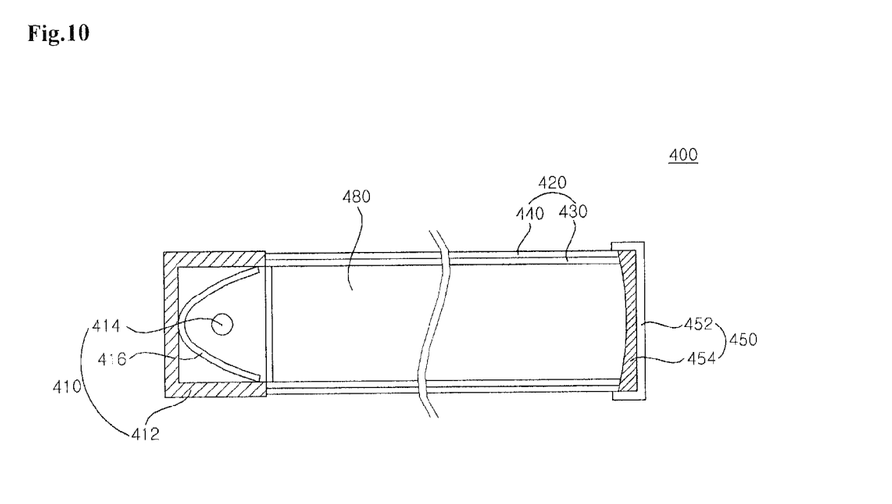
FIG. 10 illustrates a cross-sectional view of the illuminating device taken along line B-B' of FIG. 7.

FIG. 10 illustrates a cross-sectional view of the illuminating device 400 taken along line B-B' of FIG. 7. As shown in FIG. 10, the illuminating device 400 may include the light source unit 410, the light pipe 420 and the reflecting cap 450. The light source unit 410 may include a housing 412, a light source 414, and a reflective mirror 416. The light pipe 420 may include the optical film 430 and the supporter 440, and the reflecting cap 450 may include a cap portion 452 and a reflective material 454.

The light source unit 410 may include the light source 414 that emits light, the reflective mirror 416 that reflects the light emitted by the light source 414 and thus guides the reflected light into the light pipe 420, and the housing 412 that holds the light source 414 and the reflective mirror 416 therein.

The light source 414 may be a lamp that generates light. Various types of lamps may be used as the light source 414. For example, a halogen lamp, a light-emitting diode (LED) lamp, a metal halide lamp, or a plasma lighting source may be used as the light source 414.

The reflective mirror 416 may be disposed at a rear of the light source 414. The surface of the reflective mirror 416 may be coated with a highly-reflective metal material such as aluminum or silver.

The structure of the reflective mirror 416 may be determined according to a length of the illuminating device 400. The reflective mirror 416 may be implemented as an aspherical reflective mirror. For example, the reflective mirror 416 may be implemented as an aspherical reflective mirror coated with a metal material such as aluminum or silver, thereby improving reflexibility of the reflective mirror 416.

The housing 412 may have an empty space therein and may thus be able to hold the light source 414 and the reflective mirror 416 therein. The housing 412 may protect the light source 414 and the reflective mirror 416 against external shock or foreign materials, for example.

The housing 412 may be formed of a rigid, heat-resistant material that may be easily processed to effectively protect the light source 414 and the reflective mirror 416.

The light pipe 420 may be optically connected to the light source unit 410. The light pipe 420 may transmit and distribute light generated by the light source unit 410.

The light pipe 420 may include the supporter 440 and the optical film 430, which is surrounded by the supporter 440 and has a patterned surface for reflecting or refracting light.

A first surface of the optical film 430 facing the supporter 440 may be patterned. For example, the first surface may be patterned to have a plurality of peaks and a plurality of valleys formed from the plurality of peaks. The optical film 430 may be provided in a rolled shape (either fully or partially) to have a hollow conduit (or area) 480. The optical film 430 may transmit and distribute light emitted by the light source unit 410 and thus enable the light pipe 420 to uniformly emit light.

A plurality of scattering patterns may be formed on a second surface of the optical film 430. The area and the density of the scattering patterns may gradually increase according to distance from the light source unit 410.

A number of prism peaks corresponding to each of the scattering patterns and an area (or size) and a density of the scattering pattern has been described above with reference to FIGS. 3-5, and thus a further detailed descriptions will not be provided. The optical film 430 will be described below in further detail with reference to FIG. 11.

The reflecting cap 450 may include the cap portion 452 that is attached to one end of the light pipe 420, and the reflective material 454 that is disposed inside the cap portion 452 and reflects light transmitted by the light pipe 420.

The reflective material 454 may be coated with a highly-reflective metal material such as aluminum or silver and may thus be able to effectively reflect light transmitted by the light pipe 420.

The reflective material 454 may be flat or spherical. More specifically, the reflective material 454 may be implemented as a concave mirror having a curvature of 0.001 or less.

Figure 11:
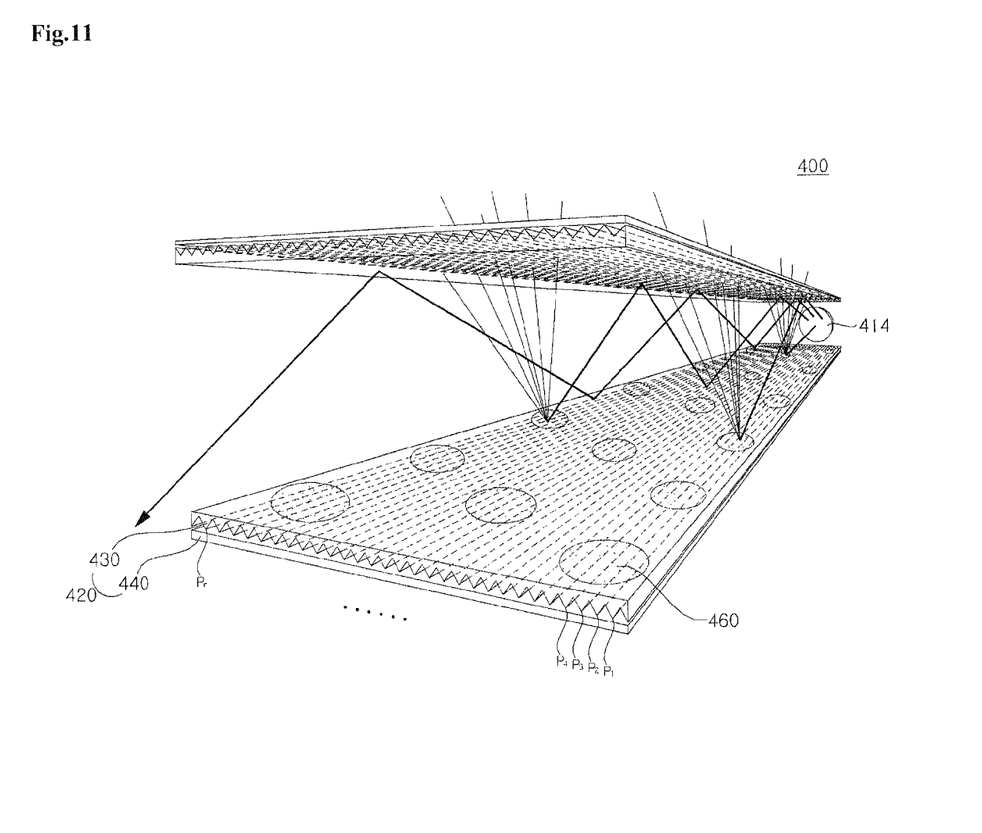
FIG. 11 illustrates a perspective view of part of the illuminating device shown in FIG. 7.

FIG. 11 illustrates a perspective view of part of the illuminating device 400 shown in FIG. 7. As shown in FIG. 11, the illuminating device 400 may include a light source unit including a housing (not shown), the light source 414, and a reflective mirror (not shown). The illuminating device 400 may also include the light pipe 420 including the optical film 430 and the supporter 440, and a reflecting cap (not shown) including a cap portion (not shown) and a reflective mirror (not shown). The light source unit, the light pipe 420 and the reflecting cap have been described above with reference to FIG. 10. A plurality of scattering patterns 460 formed on the optical film 430 may be described below.

The scattering patterns 460 may scatter light. The scattering patterns 460 may be printed on a second surface of the optical film 430 using white ink, for example.

The area (or size) of the scattering patterns 460 may gradually increase according to distance from the light source 414.

If the light source 414 is disposed on one side of the light pipe 420, the amount of light emitted from a portion of the light pipe 420 distant from the light source 414 may be less than an amount of light emitted from a portion of the light pipe 420 closer the light source 414. Thus, in order to effectively scatter light even in distant portions of the optical film 430 from the light source 414, an area (or size) of the scattering patterns 460 may gradually increase according to distance from the light source unit 414.

For example, as shown in FIG. 11, a scattering pattern 460 closest to the light source 414 may correspond to three peaks of the optical film 430, and a scattering pattern 460 most distant from the light source 414 may correspond to six peaks of the optical film 430. Thus, a size of each of the scattering patterns 460 at one area of the optical film 430 may be smaller than a size of another one of the scattering patterns at another area of the optical film 430.

The area (or size) of the scattering pattern 460 closest to the light source 414 may be larger than the area (or size) of a scattering pattern 460 most distant from the light source 414.

The number of prism peaks corresponding to each of the scattering patterns 460 may gradually increase from three to six according to distance from the light source 414. In this case, light may be effectively scattered even in distant portions of the optical film 430 from the light source 414 and may reduce illuminance differences between portions of the light pipe 420. Therefore, an illuminating device may be provided with uniform illuminance and luminance by increasing an amount of light emitted from distant portions of the light pipe 420 from the light source 414.

In at least one embodiment, a number of the scattering patterns at a first area of the optical film may be less than a number of scattering patterns at a second area of the optical film. In this embodiment, each of the scattering patterns may have a substantially same size.

The density of the scattering patterns 460 may gradually increase according to distance from the light source 414. Stated differently, a number of the scattering patterns 460 at one area may be less than a number of the scattering patterns 460 at another area. In this case, the scattering patterns 460 may have a substantial same size. In this manner, the area of the scattering patterns 460 may gradually increase according to distance from the light source 414.

A total area of the scattering patterns near the reflecting cap may be greater than a total area of the scattering pattern near the light source 414.

The relationship between the luminous exitance of the optical film 430 and the number of prism peaks corresponding to each of the scattering patterns 460 of the optical film 430 has been described above with reference to FIG. 5 and thus a further detailed description will be omitted.

The light pipe 420 is shown in FIG. 11 as having a panel structure, although embodiments of the present invention are not restricted to this arrangement. That is, the light pipe 420 may be rolled (or in a rolled shape), and the optical film 430 and the supporter 440 may also be rolled (or in a rolled shape).

Figure 12:
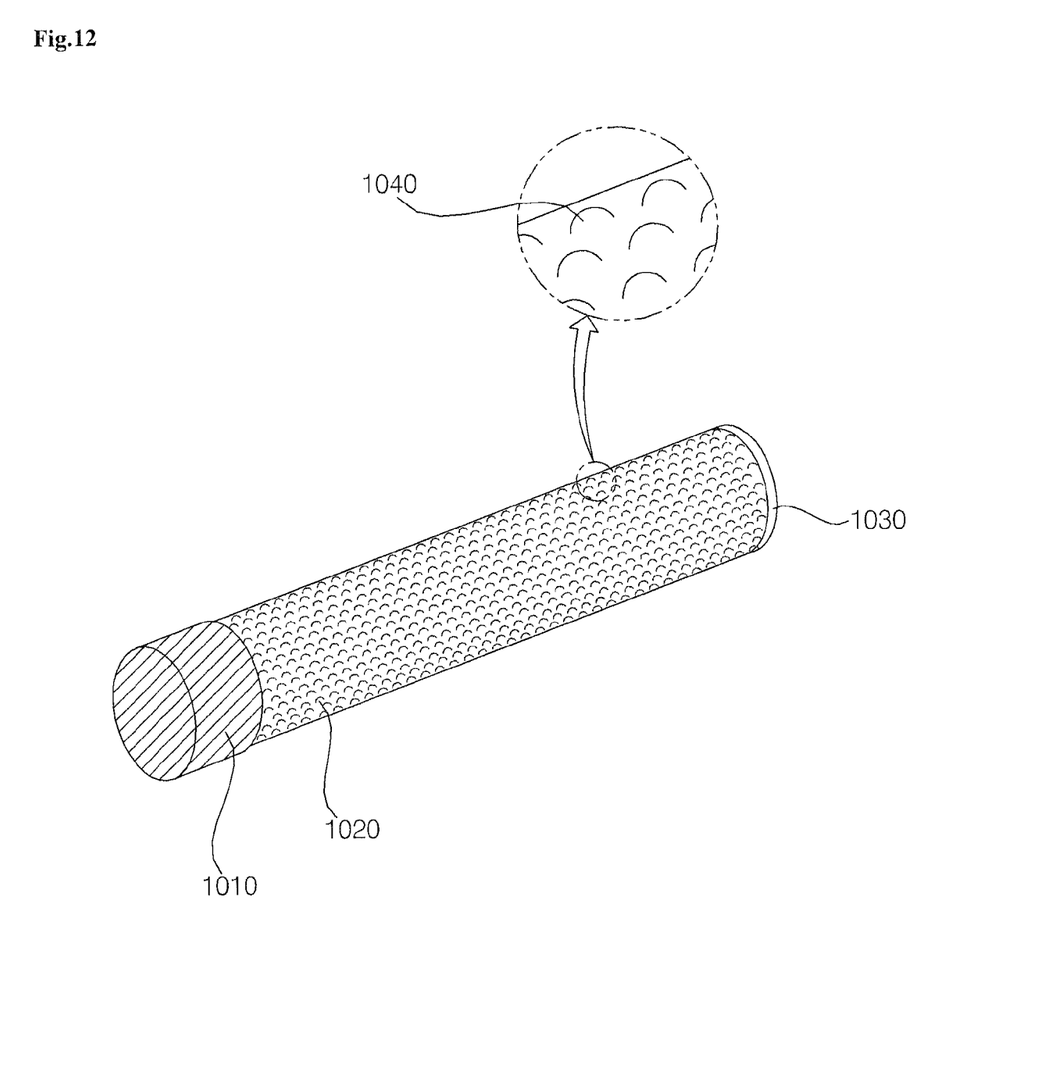
FIG. 12 illustrates a perspective view of an illuminating device according to another example embodiment of the present invention.

FIG. 12 illustrates a perspective view of an illuminating device according to another example embodiment of the present invention. Other embodiments and configurations are also within the scope of the present invention.

As shown in FIG. 12, an illuminating device includes a light source unit 1010, a light pipe 1020 and a reflecting cap 1030. The illuminating device shown in FIG. 12 is different from the illuminating device shown in FIG. 7 in that a plurality of protrusions 1040 are formed on a surface of a supporter of the light pipe 1020. The plurality of protrusions 1040 may be formed as one integral body with the supporter of the light pipe 1020. A plurality of indentations may also be formed on the surface of a supporter of the light pipe 1020. The plurality of indentations may be formed as one integral body with the supporter of the light pipe 1020.

Due to the protrusions 1040 on the light pipe 1020, light may be uniformly emitted across the whole light pipe 1020.

Figure 13:
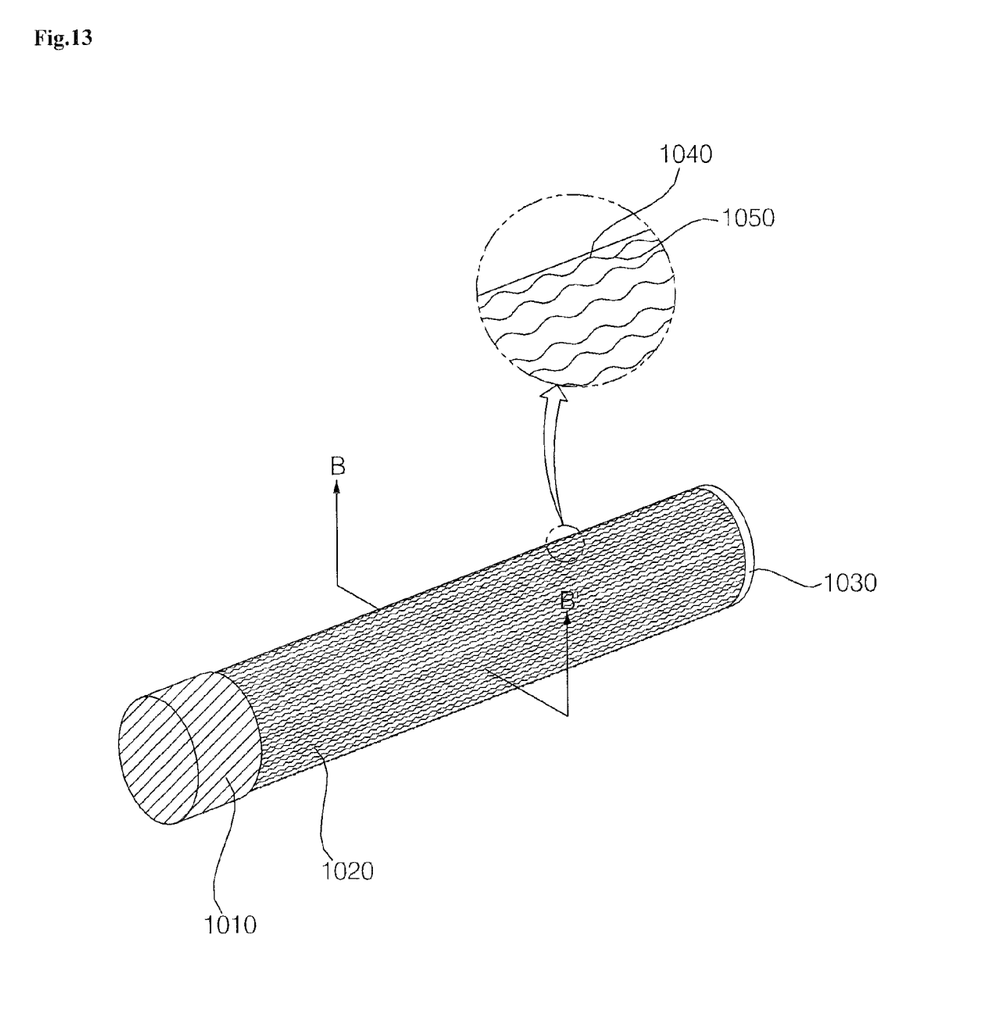
FIG. 13 illustrates a perspective view of an illuminating device according to another example embodiment of the present invention.

FIG. 13 illustrates a perspective view of an illuminating device according to another example embodiment of the present invention. Other embodiments and configurations are also within the scope of the present invention.

As shown in FIG. 13, an illuminating device may include a light source unit 1010, a light pipe 1020 and a reflecting cap 1030. The illuminating device shown in FIG. 13 is different from the illuminating device shown in FIG. 7 in that a plurality of protrusions 1040 and a plurality of indentations 1050 are formed on a surface of a supporter of the light pipe 1020. The plurality of protrusions 1040 and the plurality of indentations 1050 may be formed as one integral body with the supporter of the light pipe 1020

Due to the protrusions 1040 and the indentations 1050 on the light pipe 1020, light may be uniformly emitted across the whole light pipe 1020.

Figure 14:
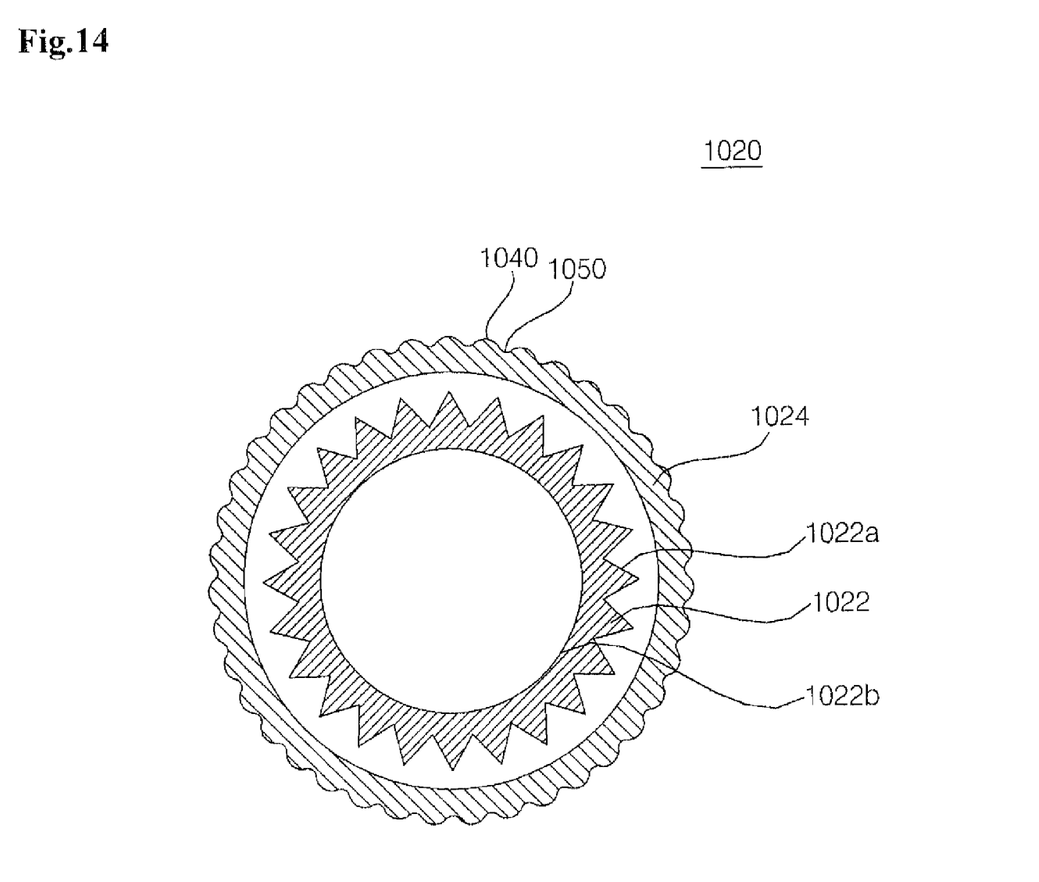
FIG. 14 illustrates a cross-sectional view of the light pipe taken along line B-B' of FIG. 13.

FIG. 14 illustrates a cross-sectional view of the light pipe taken along line B-B' of FIG. 13. Other embodiments and configurations are also within the scope of the present invention.

As shown in FIG. 14, the light pipe 1020 includes a supporter 1024 and an optical film 1022 having a first surface 1022*a*, which is a patterned surface on which a plurality of prisms are formed, and a second surface 1022*b* opposite the first surface 1022*a*.

The light pipe 1020 shown in FIG. 14 differs from the light pipe 420 shown in FIG. 7 in that the plurality of protrusions 1040, the plurality of indentations 1050 or both are formed on at least one of an inner surface and an outer surface of the supporter 1024. The protrusions 1040 and the indentations 1050 may be formed by performing surface treatment on the supporter 1024 through injection, extrusion, roll processing, thermal curing, or UV curing. For example, the protrusions 1040 and/or the indentations 1050 may be formed on the supporter 1024 by pressing a roll or a plate engraved with a plurality of protrusions and/or a plurality of indentations down on a surface of the supporter 1024.

The protrusions 1040 and/or the indentations 1050 may also be formed on the supporter 1020 by injecting resin into a panel-type mold engraved with a plurality of protrusions and/or a plurality of indentations and curing the resin. The formation of the protrusions 1040 and/or the indentations 1050 may be performed in various manners, other than those set forth herein.

Since the protrusions 1040 and the indentations 1050 scatter or totally reflect light, light may be uniformly emitted from the light pipe 1020 regardless of the location of a light source unit.

A light pipe may be provided that includes an optical film having a plurality of scattering patterns. Thus, light may be effectively scattered. Additionally, a difference between illuminance of portions of the light pipe close to a light source unit and illuminance of portions of the light pipe distant from the light source unit may be reduced. Still further, uniformity of illuminance and luminance of a light pipe across a longitudinal direction of the light pipe may be improved.

Embodiments of the present invention may provide an optical film that has a plurality of scattering patterns formed thereon and may thus effectively scatter light, and an illuminating device having the optical film.

An optical film may be provided that includes a first surface including a plurality of peaks and valleys, a second surface opposite to the first surface, and a plurality of scattering patterns (or dot patterns) on the second surface, wherein one of the scattering patterns corresponds to 3 to 6 peaks of the first surface.

An illuminating device may include a light source and a light pipe transferring and distributing a light emitted from the light source. The light pipe may include an optical film having a first surface including a plurality of peaks and valleys, a second surface opposite to the first surface, and a plurality of scattering patterns on the second surface. One of the scattering patterns may correspond to 3 to 6 peaks of the first surface.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illuminating device comprising:
   a light source; and
   a light pipe for distributing a light emitted from the light source, the light pipe including an optical film that comprises:

a first surface including a plurality of peaks and a plurality of valleys formed from the peaks, a second surface opposite the first surface, and a plurality of scattering patterns on the second surface, wherein one of the scattering patterns corresponds to 3 to 6 peaks of the plurality of peaks of the first surface, wherein the light pipe further includes a supporter to surround the first surface of the optical film and the supporter includes a plurality of protrusions and indentations formed as one integral body with the supporter.

2. The optical film of claim 1, wherein the plurality of peaks and the plurality of valleys are formed from a linear array of prisms.

3. The illuminating device of claim 2, wherein the optical film is provided in a rolled shape to have a hollow conduit that extends along a longitudinal direction of the linear array of prisms.

4. The illuminating device of claim 1, further comprising a reflecting cap.

5. The illuminating device of claim 4, wherein a size of the scattering patterns near the reflecting cap is greater than a size of the scattering patterns near the light source.

6. The illuminating device of claim 4, wherein a total area of the scattering patterns near the reflecting cap is greater than a total area of the scattering patterns near the light source.

7. The illuminating device of claim 1, wherein the light source is at least one of a halogen lamp, a light emitting diode (LED) lamp, a metal halide lamp, and a plasma lighting source.

8. A light pipe comprising:
an optical film; and
a supporter to surround the optical film;
wherein the optical film comprises:
a first surface including a plurality of peaks and a plurality of valleys formed from the peaks;
a second surface opposite the first surface; and
a plurality of scattering patterns on the second surface, wherein one of the scattering patterns corresponds to 3 to 6 peaks of the plurality of peaks of the first surface, and
wherein the supporter includes a plurality of protrusions and indentations formed as one integral body with the supporter.

9. The light pipe of claim 8, wherein each of the scattering patterns is a dot pattern.

10. The light pipe of claim 8, wherein the plurality of peaks and the plurality of valleys are formed from a linear array of prisms.

11. The light pipe of claim 10, wherein the optical film is provided in a rolled shape to have a hollow conduit that extends along a longitudinal direction of the linear array of prisms.

12. The light pipe of claim 8, wherein a size of one of the scattering patterns at a first area of the optical film is smaller than a size of one of the scattering patterns at a second area of the optical film.

13. The light pipe of claim 8, wherein a number of the scattering patterns at a first area of the optical film is less than a number of scattering patterns at a second area of the optical film, and wherein each of the scattering patterns on the second surface has a substantially same size.

14. The light pipe of claim 8, wherein a total area of the scattering patterns at a first area of the optical film is greater than a total area of the scattering patterns at a second area of the optical film.

15. The light pipe of claim 14, wherein the first area of the optical film includes a greater number of the scattering patterns as compared to the second area of the optical film.

16. The light pipe of claim 14, wherein a size of each of the scattering patterns at the first area is larger than a size of each of the scattering patterns at the second area.

* * * * *